(12) United States Patent
Brechbill et al.

(10) Patent No.: US 6,347,872 B1
(45) Date of Patent: Feb. 19, 2002

(54) SNAP-IN REARVIEW MIRROR ASSEMBLY FOR VEHICLES

(75) Inventors: Cory D. Brechbill, Swanksville; John S. McPherson, Perkasie, both of PA (US)

(73) Assignee: Delbar Products Inc., Perkasie, PA (US)

( * ) Notice: Subject to any disclaimer, the term of this patent is extended or adjusted under 35 U.S.C. 154(b) by 0 days.

(21) Appl. No.: 09/785,294

(22) Filed: Feb. 20, 2001

(51) Int. Cl.⁷ ............................................. G02B 7/182
(52) U.S. Cl. ..................... 359/879; 359/880; 359/838; 359/841
(58) Field of Search .................. 359/879, 880, 359/838, 841, 871, 872, 875, 865; 248/476, 481

(56) References Cited

U.S. PATENT DOCUMENTS

| | | | |
|---|---|---|---|
| 3,824,540 A | * 7/1974 | Smith, II | 340/63 |
| 4,080,049 A | * 3/1978 | Oskam et al. | 350/289 |
| 4,319,313 A | * 3/1982 | Eherhart et al. | 362/370 |
| 5,142,890 A | * 9/1992 | Uyeda et al. | 70/277 |
| 5,160,205 A | * 11/1992 | Mistyurik | 400/248 |
| 5,355,255 A | 10/1994 | Assinder | 359/871 |
| 5,524,944 A | * 6/1996 | Berg | 292/163 |
| 5,629,810 A | 5/1997 | Perry et al. | 359/872 |
| 5,721,646 A | 2/1998 | Catlin et al. | 359/865 |
| 5,738,462 A | 4/1998 | Petersen et al. | 403/353 |
| 5,799,914 A | 9/1998 | Chivallier et al. | 248/176.1 |

* cited by examiner

Primary Examiner—Mohammad Sikder
(74) Attorney, Agent, or Firm—Gregory J. Gore

(57) ABSTRACT

A drop-and-slide attachment system for attaching a mirror to a vehicle rear-view mirror housing utilizes forward projecting, notched posts on a support panel fit axially into a slotted, mirror-back mounting plate. When the mirror mounting plate is moved laterally, the posts slide in the slots until notches engage arcuate edges at one end of each of the slots. During this lateral movement, a stop on the support panels bears against a compression spring on the mounting plate. When the mirror plate reaches the attached home position, a resilient latch snaps behind a retaining abutment of a catch on the support panel trapping the panel against the compressed spring. This construction requires only a very small gap between the edge of the mirror glass and the surrounding housing, thus providing a pleasing appearance.

7 Claims, 5 Drawing Sheets

SNAP-IN REARVIEW MIRROR ASSEMBLY FOR VEHICLES

FIELD OF THE INVENTION

The present invention relates to automotive external rearview mirror assemblies. More specifically, it relates to the structure and method for installing or removing the mirror glass after all of the other rearview mirror components in a housing unit have been assembled.

BACKGROUND OF THE INVENTION

Exterior rearview mirrors are used on all types of motor vehicles to provide rearward vision. Typically the mirrors are mounted in an aerodynamic housing which affixes to the outside of the vehicle door panel. The housing supports the mirror glass and also includes other electrical devices, such as, a motorized mirror positioner, heating element for defrosting, and lighting. The mirror assemblies, therefore, include many different components which need to be carefully assembled. For various reasons, the installation of the mirror glass is preferably the final step in the assembly process. Also, because the mirror glass may become broken, it is advantageous to be able to replace the mirror glass without disassembling the rearview mirror housing unit.

In order to provide a convenient means of securing the mirror glass to a supporting element within the rearview mirror assembly, a snap-in type attachment/release means of affixing the mirror glass is desired. However, these attachment methods usually do not meet the requirements of properly holding the mirror glass in place to provide a clear, reflected view. The mirror glass must be held rigidly so that it moves with the vehicle body and is held firmly against rattle or vibration to keep reflected images from being blurred. Prior art snap-fit attachment systems do not reliably meet these attachment requirements. Furthermore, snap-fit attachment systems often can not be used for aesthetic reasons because the mirror glass must fit tightly to the mirror housing around its perimeter and as such the edge gap between the mirror and the housing may be no greater than 5 mm. Aesthetic considerations therefore greatly restrict the possibility of snap-fitting the mirror glass into place by lateral movement.

Various rearview mirror glass snap-in systems have been attempted in the past. For example, U.S. Pat. No. 5,721,646, entitled "Exterior Rearview Mirror For Vehicle", discloses a bayonet mounting and latch assembly in which the mirror support panel is attached to the housing supporting structure through an intermediate bezel ring which is rotated to capture headed posts in T-slots formed in the ring. The ring is held at its position of attachment by a resilient latch that snaps into a radial groove on the ring. Vibration is reduced by increasing the natural frequency of the support bracket and housing by increasing the stiffness and rigidity of the support bracket. While this assembly provides a convenient releasable mirror glass element, it is complicated by the use of an intermediate bezel ring and the rigidity of the mirror glass mounting is inherently compromised by the bezel ring engagement tolerance.

There is therefore a need in the art for a snap-in type releasable mirror glass mounting system for an external vehicle rearview mirror assembly which is aesthetically pleasing and which holds the mirror element securely against vibration so that clarity of the reflected vision viewed in the mirror is provided.

SUMMARY OF THE INVENTION

In order to meet the need in the art described above, the present system for mounting a mirror element to the housing of a vehicle rearview mirror assembly has been devised. In the present system a releasable snap-in fit of the mirror element to its supporting structure is provided with a minimum of lateral movement required for installation. This necessitates only a very small gap between the edge of the mirror glass and the surrounding housing, thus providing a pleasing appearance. Furthermore, once attached, the mirror is firmly captured by spring force both laterally and axially so that even if the mating elements which releasably engage the parts become worn or are produced with excessive clearance any lost motion is taken up by the spring. The present invention thereby eliminates any rattle of the mirror glass, and therefore improves vision.

The above desirable characteristics of the present invention are provided by a drop-and-slide attachment system in which forward-projecting, notched posts on a support panel fit axially into a slotted, mirror-back mounting plate. When the mirror mounting plate is moved laterally, the posts slide in the slots until the notches engage arcuate edges at one end of each of the slots. During this movement, a stop on the support panel bears against a compression spring on the mounting plate. When the mirror plate reaches the attached home position, a resilient latch snaps behind a retaining abutment of a catch on the support panel trapping the panel against the compressed spring. The spring also forces the support panel axially, as well as laterally, and therefore when the mirror element is locked in place it is captured firmly both laterally and longitudinally because any axial clearance between the notches and posts is also forceably taken up the pressure of the spring.

The latch has a wide engagement tip that bears directly against a broad abutment on the side of the catch. Therefore, the latch also secures the mounting plate to the support panel against rotation. The latch is located on the mounting plate directly behind the perimeter of the mirror glass so that it may be depressed by a tool inserted from the outside along the edge of the glass to release the mounting plate. When the latch is released, the compression spring ejects the mounting plate, moving the notched posts toward their released position. Thus, the mirror glass and mounting plate may be easily removed after assembly and reinstalled.

It is therefore the main object of the present invention to provide a releasable mirror glass mounting system for an external rearview mirror of a vehicle which is aesthetically pleasing and which holds the mirror elements securely against vibration to provide clarity of reflected vision. It is a further object of the present invention to provide a releasable mirror glass mounting system for a rearview mirror in which the mirror glass mounting plate may be secured directly to the motor positioning support panel without the need for additional parts. It is yet another object of the present invention to provide a releasable mirror glass rearview mirror assembly which may be economically produced and which has a long life.

The following drawings and descriptions of the preferred embodiment will further explain in detail the present invention and other objects and advantages will become apparent to those of skill in the art.

DESCRIPTION OF THE PREFERRED EMBODIMENT

Figure 1:
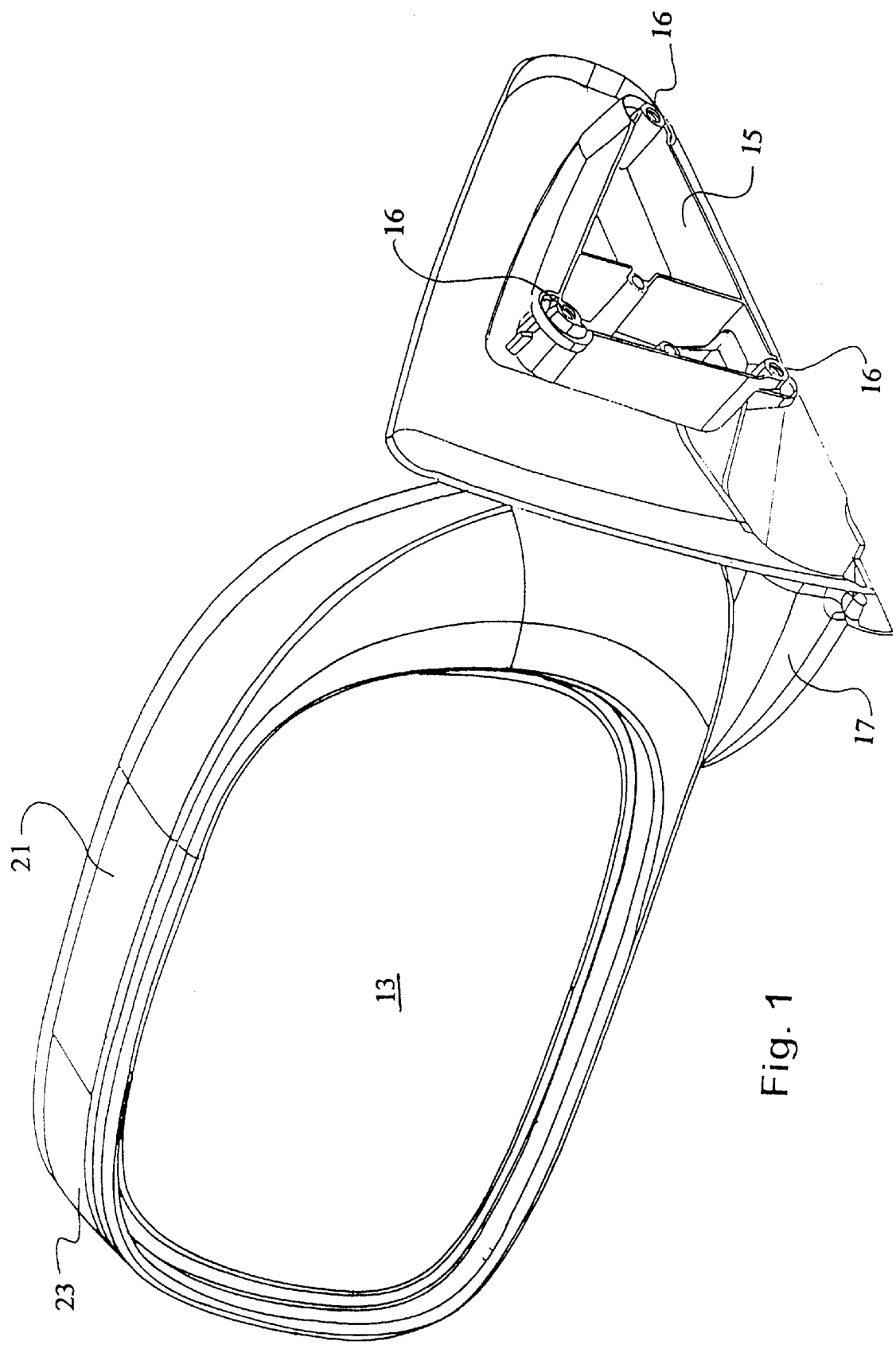
FIG. 1 is a top right front isometric view of a rearview mirror assembly which includes the present invention.

Referring now to FIG. 1, a complete rearview mirror assembly which incorporates the mirror glass attachment system of the present invention is shown. It can be seen from this figure that the mirror glass 13 is closely fitted within the surrounding front and rear cases 23 and 24, providing an aesthetically pleasing appearance. The mirror housing is supported on bracket 15 which is covered also for appearance by applique 17. Fastening means 16 permit attachment of the mirror housing assembly to a vehicle panel (not shown).

Figure 2:
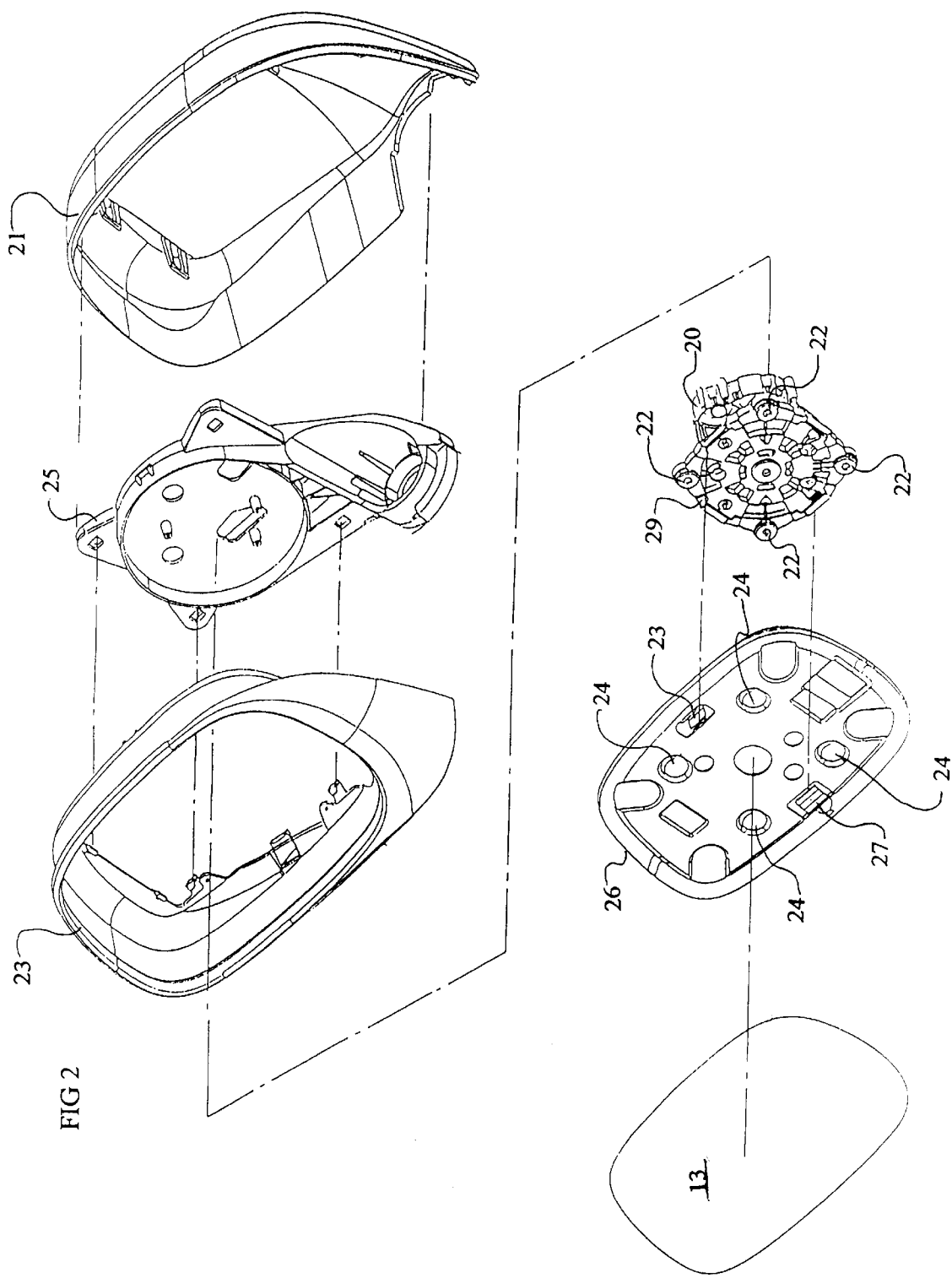
FIG. 2 is a top right front isometric assembly view.

Referring now to FIG. 2, an exploded assembly view of the mirror housing shown in FIG. 1 is depicted. The major components of the rearview mirror unit include front and rear cases 23 and 21, and center support bracket 25. An electric mirror positioning motor 20 which includes a support panel 29 is fastened directly to the center support bracket 25. Mirror glass 13 is adhesively affixed to its mounting plate 26.

By the novel arrangement of parts which constitute the present invention, the mirror glass and attached mounting plate are releasably and slidably attached to the mirror support panel 29 as follows. Attachment between the mirror mounting plate and the support panel is achieved by first placing the four recessed slots 24 in the mirror mounting plate over posts 22 located at the corners of the motor support panel. The mounting plate is then slid downward so that notches in posts engage the edges of the slots. When moved to its fully engaged home position, mounting plate latch member 27 traps and locks elements of the support panel against compression spring 23 .

Figure 3:
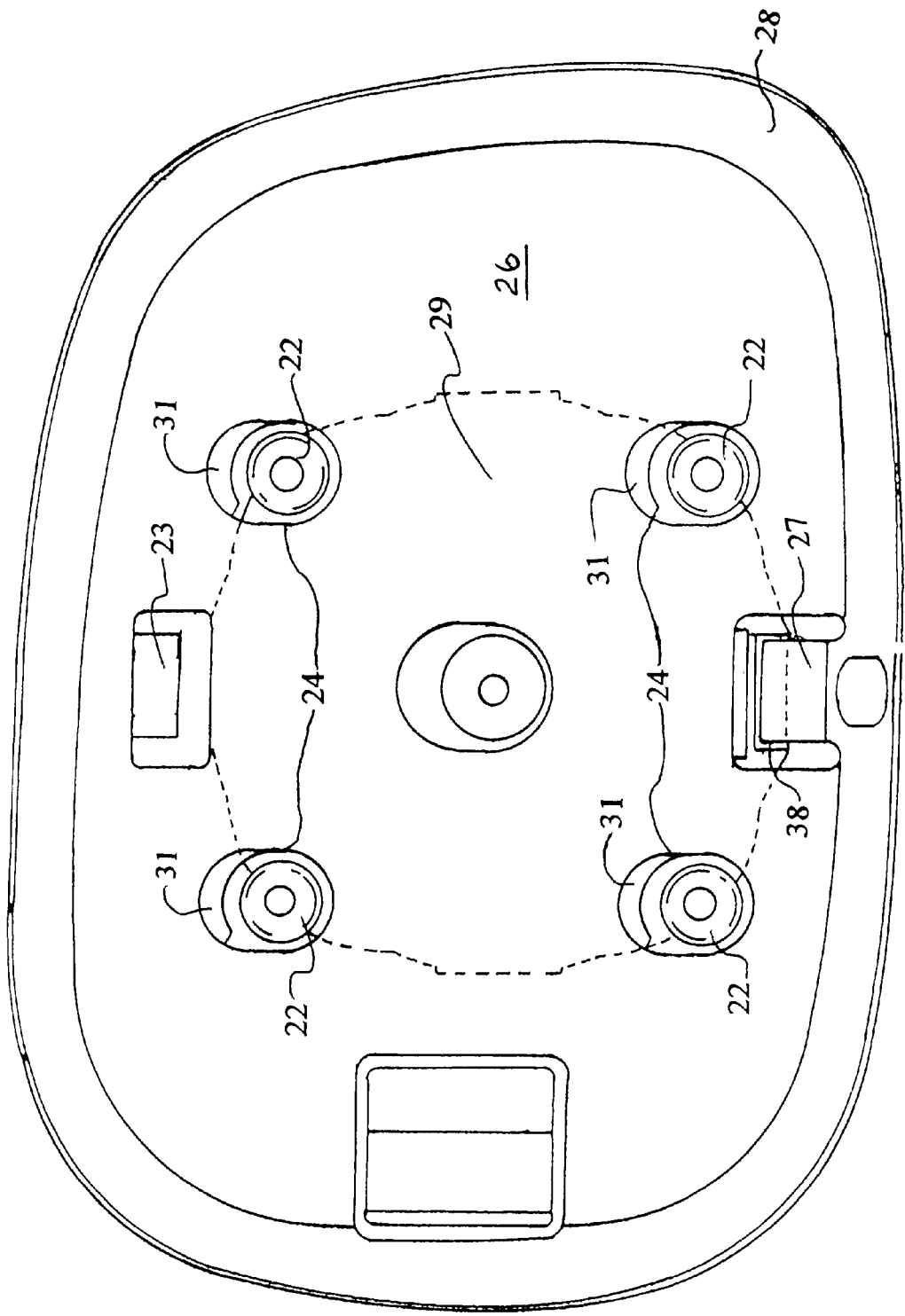
FIG. 3 is front view of the mirror mounting plate and mirror support panel shown in isolation.

Referring now to FIG. 3, the mirror mounting plate 26 with the support panel 29 (outline shown in broken lines) are in face-to-face contact, but in the released position. This figure depicts the mirror mounting plate placed over the posts 22 which rest in slots 24. Slots 24 include an edge 31 at one end for engaging notches in posts 22. Compression spring 23 operates laterally, and in this figure is fully extended and free. Similarly, snap-down latch 27 is free of contact with the support panel having the operative end of the latch residing in a well of a catch 38 on the support panel. Thus, there is zero axial insertion force required for full placement of the posts into slots. The posts are equally spaced radially as are identical catch/stop elements so that the support panel may be assembled to the housing in any of four, ninety-degree, radial positions. Rolled edge 28 provides a reinforcement rim around the circumference of the relatively thin plastic part for added strength.

Figure 4:
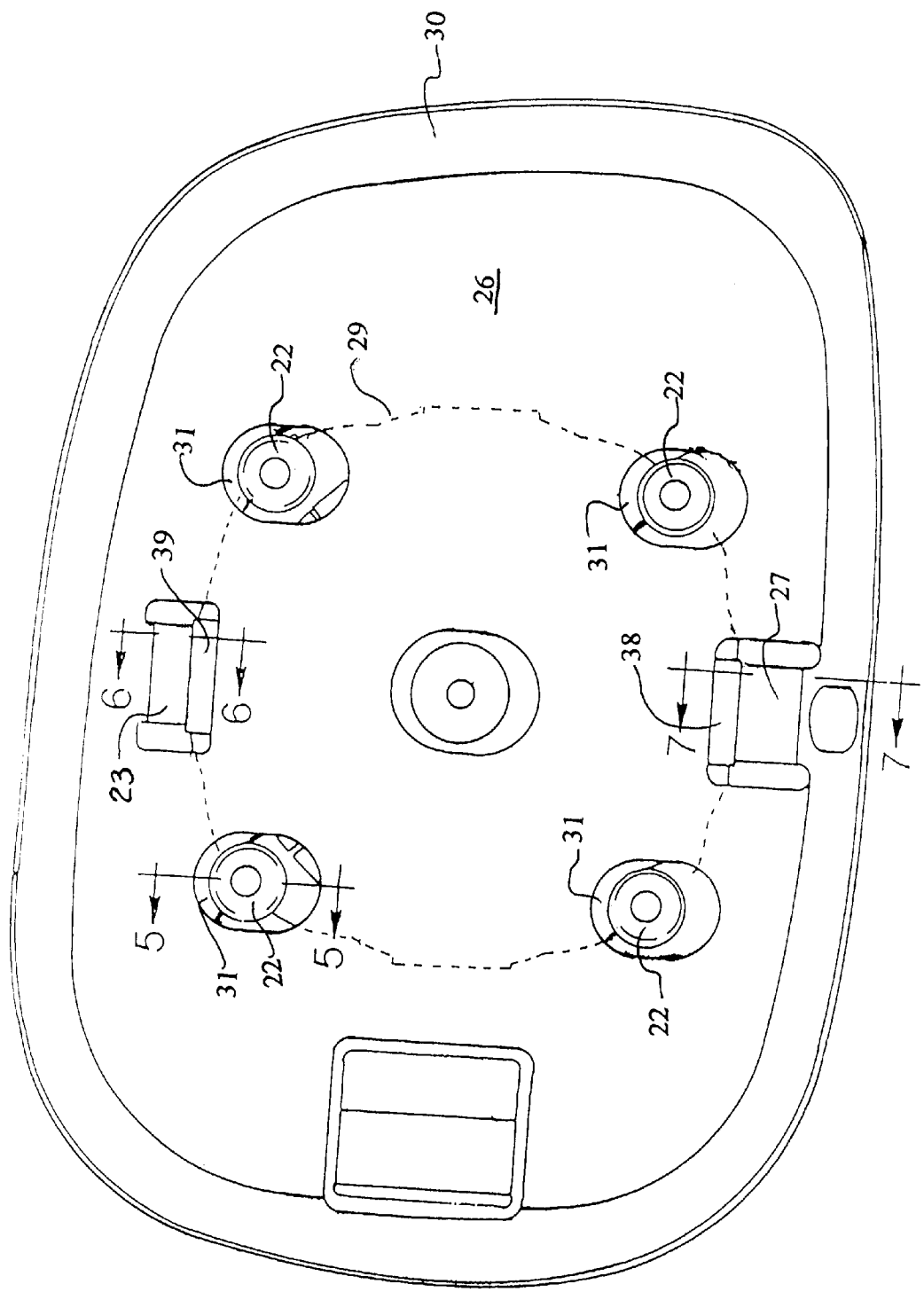
FIG. 4 is a front view of the mirror mounting plate and motor support panel as shown in FIG. 3, except with the mounting plate moved to its locked position.
Figure 7:
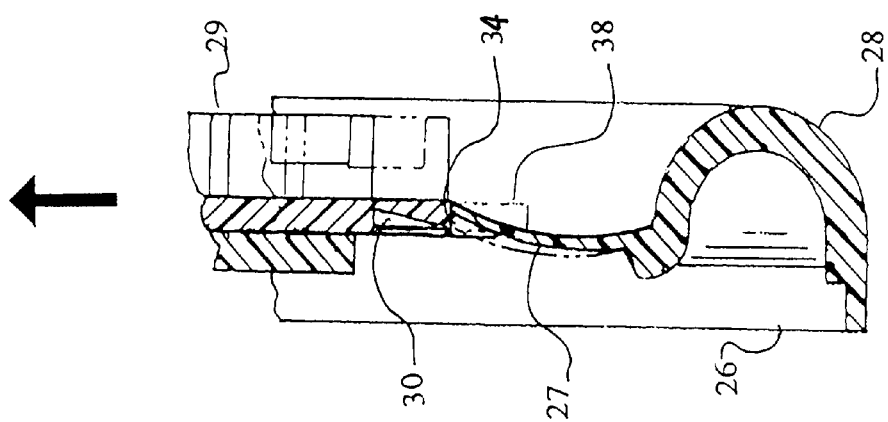
FIG. 7 is a side sectional view showing detail of the mounting plate latch mechanism with a released position shown in phantom.
Figure 6:
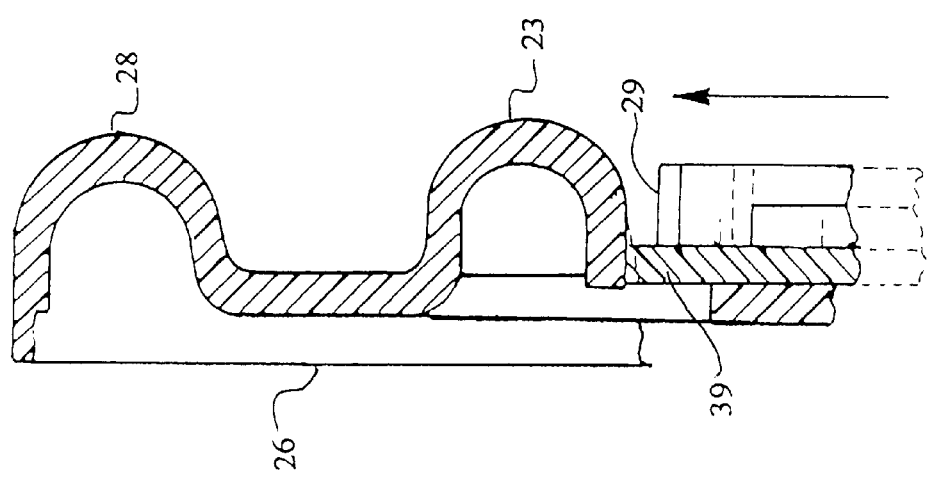
FIG. 6 is a side sectional view showing detail of the mounting plate compression springs with a released position shown in phantom.
Figure 5:
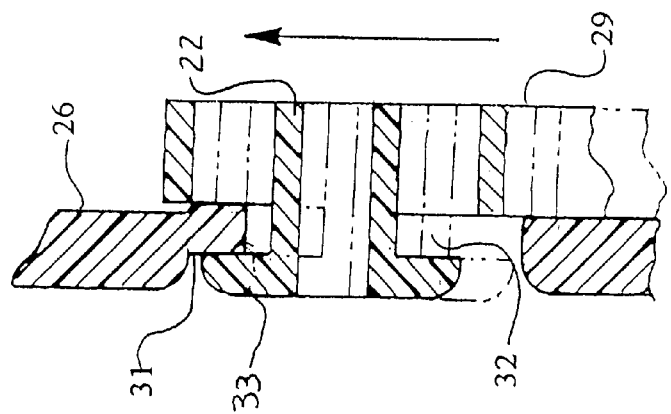
FIG. 5 is a side sectional view taken from FIG. 4 showing detail of notched posts in engagement with edges of the mounting plate slots with a released position shown in phantom.

Referring now to FIG. 4, the same view as FIG. 3 is shown, except that the mounting plate 26 is moved downward with respect to the support panel 29 into its home position of full engagement. As seen in this view, compared to FIG. 3, spring 23 is now contacted by stop a 39 at the top of the support panel 29 and is compressed. Latch 27 comprises a leaf spring which is only deflectable axially having a curved surface and a wide engagement tip that snaps downward behind catch 38 when the mounting plate arrives at its home (locked) position. FIGS. 5, 6 and 7 show greater detail of operative elements shown in this figure with the mounting plate in both its released and locked positions, and now will be referred to individually.

FIGS. 5, 6 and 7 are cross-sectional views of operative areas of the mounting plate and support panel taken from FIG. 4 as shown in that Figure. The purpose of these illustrations is to demonstrate the relative motion between the engaging parts is shown with the support panel moving upward with regard to the mounting plate.

Referring now to FIG. 5, engagement between one of the posts 22 and arcuate edge 31 of the mounting plate slot is shown, after the rounded head of the post has been inserted through the aperture of the mounting plate. As the mounting post is moved upward, an arcuate edge of the head of the post traps an arcuate edge 31 in a notch 32 just beneath the head 33 of the post. Thus, creating a close fit between the engaged parts holding them against relative movement axially. The head of each post is radiused to facilitate insertion into the slots.

FIG. 6 shows an abutment 39 of the support panel 29 which bears against spring 23 that flexes laterally. From its at rest position, shown in phantom, U-shaped spring 23 on the mounting plate 26 has deflected by contact with support panel 29. The force of the compression spring 23 also urges the support panel against the mounting plate axially so that the engagement tolerance is taken up as shown in FIG. 5. Thus, the two parts are firmly held in contacting engagement axially by the posts and under lateral resilient compression of the spring. Reinforcement rim 28 is located along the edge of the mounting plate.

In FIG. 7, details of snap-down latch 27 comprising a resilient leaf which is biased axially in the direction of the support panel are shown. In its initial inserted position shown in phantom, the tip of the latch 27 rests in a well at the base of ramp 30. As the mounting plate is moved upward with respect to the panel, latch 27 flexes upward (to the left in this figure) as it rides up the ramp 30 of catch 38 on the panel, moving toward its home position. At its home position, the latch has ridden over the end of the ramp 30 and has snapped fully downward behind the catch 38 to contact an abutment 34 at the back of the catch which acts as a stop, opposing the force of the lateral compression spring (shown in FIG. 6). Another abutment 39 of an identical catch/stop structure located 180° from the operative catch 38 provides the opposing compression spring stop shown in FIG. 6. Thus, the mirror plate latch traps the support panel stops between the mirror plate compression spring 23 on one side and the tip of the latch 27 on the other side.

By these mechanical relations it will be readily understood that very little lateral movement is required to engage the mirror with the positioning motor in the rearview mirror housing. Therefore, the distance between the edge of the mirror and the outer case of the housing is minimal providing the desired close-fitting appearance of the mirror and the case. Furthermore, the initial placement of the mirror plate against the support panel is accomplished with zero axial insertion forces. Forces applied to the mirror plate required to lock the mirror plate into position are in the lateral direction only, thus, adding to the ease of assembly.

Thus, various objects of the invention have been achieved by the disclosed rearview mirror assembly of the preferred embodiment. It should be understood, however, there may be many modifications, adaptations, and changes that may be made without departing from the invention disclosed herein, which should be determined only by the following claims and their legal equivalents.

What is claimed is:

1. An outside rearview mirror assembly for use with a motor vehicle comprising:

a housing having fastening means for affixation to a vehicle body panel;

a support panel affixed within said housing;

a mirror having a mounting plate affixed to a rear surface thereof, said mirror mounting plate including a plurality of slots;

a plurality of notched posts projecting forward, axially from said support panel, the posts being located in registration with an equal number of said mirror mounting panel slots and once inserted into said slots, the posts are laterally movable within said slots between a released and a locked position;

notches on said posts for receiving edges of said slots when in said locked position thereby engaging said mounting plate with said support panel axially; and said mirror mounting plate further including spring means at one end and a resilient, snap-down latch at the opposite end thereof, whereby when said support panel is moved from said released position to said locked position it is captured laterally between said spring and said latch.

2. The rearview mirror assembly of claim 1, wherein in said catch includes a ramp and an abutment whereby movement of said catch toward said lock position causes said ramp to deflect said latch until said latch overrides said ramp and snaps downward behind said abutment.

3. The rearview mirror assembly of claim 2, wherein said spring means and said latch are unitary with said mounting plate, all being composed of molded plastic.

4. The rearview mirror assembly of claim 3, wherein said mounting plate includes a circumferential reinforcement rim.

5. The rearview mirror assembly of claim 4, wherein the support panel includes a plurality of identical catch means, each alternatively operational as either the catch or the compression spring stop, at least two of said catches being located radially 180° apart.

6. The rearview mirror assembly of claim 5, wherein compression spring is a substantially U-shaped member.

7. The rearview mirror assembly of claim 6, wherein said posts are freely insertable through said slots axially with zero insertion force.

* * * * *